(12) United States Patent
Matalanis et al.

(10) Patent No.: US 9,278,755 B2
(45) Date of Patent: Mar. 8, 2016

(54) MODULAR INTEGRATED DEVICE FOR ROTOR BLADE CONTROL

(75) Inventors: Claude G. Matalanis, Longmeadow, CT (US); Andrzej Ernest Kuczek, Bristol, CT (US); Zaffir A. Chaudhry, Rockford, IL (US); Brian E. Wake, South Glastonbury, CT (US); Vijaya Ramaraju Lakamraju, Longmeadow, MA (US); Alan Matthew Finn, Hebron, CT (US); Fanping Sun, Glastonbury, CT (US); Ulf J. Jonsson, South Windsor, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1082 days.

(21) Appl. No.: 13/025,394

(22) Filed: Feb. 11, 2011

(65) Prior Publication Data

US 2012/0207602 A1 Aug. 16, 2012

(51) Int. Cl.
*B64C 27/615* (2006.01)
(52) U.S. Cl.
CPC .................................. *B64C 27/615* (2013.01)
(58) Field of Classification Search
CPC ... F03D 7/0232; F03D 7/0252; B64C 27/615; B64C 2027/7261; B64C 2027/7266; B64C 2027/7294
USPC ..... 416/23, 24, 61, 169 R, 134 A; 244/17.11, 244/215, 99.14, 99.3, 99.2, 189, 178
See application file for complete search history.

(56) References Cited

U.S. PATENT DOCUMENTS

| | | | |
|---|---|---|---|
| 5,366,176 A * | 11/1994 | Loewy et al. | 244/99.8 |
| 6,168,379 B1 | 1/2001 | Bauer | |
| 6,200,096 B1 | 3/2001 | Kohlhepp | |
| 6,453,669 B2 | 9/2002 | Kennedy et al. | |
| 6,644,919 B2 * | 11/2003 | Bauer et al. | 416/23 |
| 7,028,954 B2 | 4/2006 | Van Dam et al. | |
| 7,585,151 B2 * | 9/2009 | Lorin De La Grandmaison et al. | 416/24 |
| 2006/0127222 A1 * | 6/2006 | Arelt | 416/224 |
| 2007/0128026 A1 * | 6/2007 | Grandmaison et al. | 416/23 |
| 2008/0145220 A1 | 6/2008 | Yeh et al. | |
| 2009/0074574 A1 * | 3/2009 | Godsk et al. | 416/41 |
| 2009/0290982 A1 * | 11/2009 | Madsen et al. | 416/61 |
| 2011/0229320 A1 * | 9/2011 | Hancock et al. | 416/1 |
| 2012/0070284 A1 * | 3/2012 | Westergaard et al. | 416/23 |

* cited by examiner

*Primary Examiner* — Christopher Verdier
*Assistant Examiner* — Aaron R Eastman
(74) *Attorney, Agent, or Firm* — Cantor Colburn LLP

(57) ABSTRACT

A rotor blade assembly includes a rotor blade including one or more pockets and a housing located on the rotor blade within one or more pockets. The housing is secured to the rotor blade via one or more dovetail joints. A drive mechanism for a control surface of a rotor blade includes an actuator and a rocker operably connected to the actuator. At least one hinge rod is operably connected to the rocker and operably connected to a control surface at a control surface pivot. The drive mechanism translates substantially linear motion of the actuator into rotational motion of the control surface about the control surface pivot.

11 Claims, 3 Drawing Sheets

MODULAR INTEGRATED DEVICE FOR ROTOR BLADE CONTROL

GOVERNMENT RIGHTS STATEMENT

This invention was made with Government support under Agreement No. W911W6-08-2-0002 for the Operations Support and Sustainment Technology (OSST) Advanced Technology Development (6.2) program. The Government has certain rights in the invention.

BACKGROUND OF THE INVENTION

The subject matter disclosed herein relates to rotary wing aircraft. More specifically, the subject disclosure relates to control devices for rotor blades of rotary wing aircraft.

Rotary-wing aircraft typically include passive blades which are controlled using a swashplate assembly that transfers motion of non-rotating control members to rotating control members. The transfer of motion occurs once per blade revolution (1/rev) and affects all blades in a similar fashion. On-blade control overcomes this limitation and allows for both the potential to control blades on an individual bases, and to transfer motion more than once per blade revolution. In order to perform on-blade control, blades can be equipped with one or more devices to control trim flaps, trailing edge effectors, and the like. These devices include actuators, etc, which are installed at or on the rotor blades. Installation of such devices can involve cutting holes in the rotor blade spar for routing of mechanical connections, hydraulic lines, electrical lines, etc. These holes compromise the baseline structural properties of the rotor blade, often resulting in redesign and additional strengthening of the blade to return it to baseline structural integrity. Further, the typical attachment of such structures to the blade can increase drag, noise, vibration, weight, and be intensive in maintenance time required to service, repair, or replace such devices. Finally, installation of such devices can require a complete redesign of the entire blade and limit the blade to only one particular active device. The art would well receive an improved control device and installation method thereof for control of rotor blades.

BRIEF DESCRIPTION OF THE INVENTION

According to one aspect of the invention, a rotor blade assembly includes a rotor blade including one or more pockets and a housing secured to the rotor blade within one or more of the pockets. The housing is secured to the rotor blade via one or more dovetail joints.

According to another aspect of the invention, a drive mechanism for a control surface of a rotor blade includes an actuator and a rocker operably connected to the actuator. At least one hinge rod is operably connected to the rocker and operably connected to a control surface at a control surface pivot. The drive mechanism translates substantially linear motion of the actuator into rotational motion of the control surface about the control surface pivot.

According to yet another aspect of the invention, a control system for a rotor blade includes a housing secured to a rotor blade within one or more pockets of the rotor blade. The housing is secured to the rotor blade via one or more dovetail joints. A drive mechanism is secured in the housing including an actuator and a rocker operably connected to the actuator. At least one hinge rod is operably connected to the rocker and operably connected to a control surface at a control surface pivot. The drive mechanism translates substantially linear motion of the actuator into rotational motion of the control surface about the control surface pivot.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
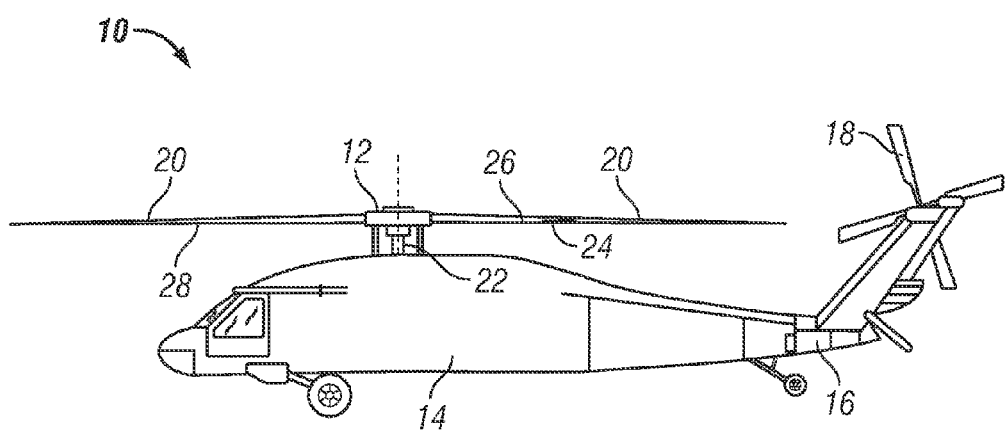
FIG. 1 is a schematic of an embodiment of a helicopter.

Shown in FIG. 1 is a schematic illustration of a rotary wing aircraft 10 having a main rotor assembly 12. The aircraft 10 includes an airframe 14 having an extending tail 16 at which is mounted an anti-torque rotor 18. Although the configuration illustrated is a helicopter, it is to be appreciated that other machines such as turbo-props and tilt-rotor aircraft will also benefit from the system of the present disclosure. The main rotor assembly 12 includes a plurality of rotor blades 20 located about a rotor shaft 22. One or more of the rotor blades 20 includes a control surface such as a trim tab 24 located at a trailing edge 26 of the rotor blade 20. While the control surface shown in FIG. 1 is a trim tab 24, it is to be appreciated that other types of on-blade control surfaces, such as conformal flaps, active flow control devices, unsteady and/or steady blowing devices, flaps, mass displacement devices, etc., are contemplated within the scope of the present disclosure. Further, while the trim tab 24 is shown located at the trailing edge 26 of the rotor blade 20, it is to be appreciated that the control surface may be disposed in other locations, for example, a leading edge 28 of the rotor blade 20.

Figure 2:
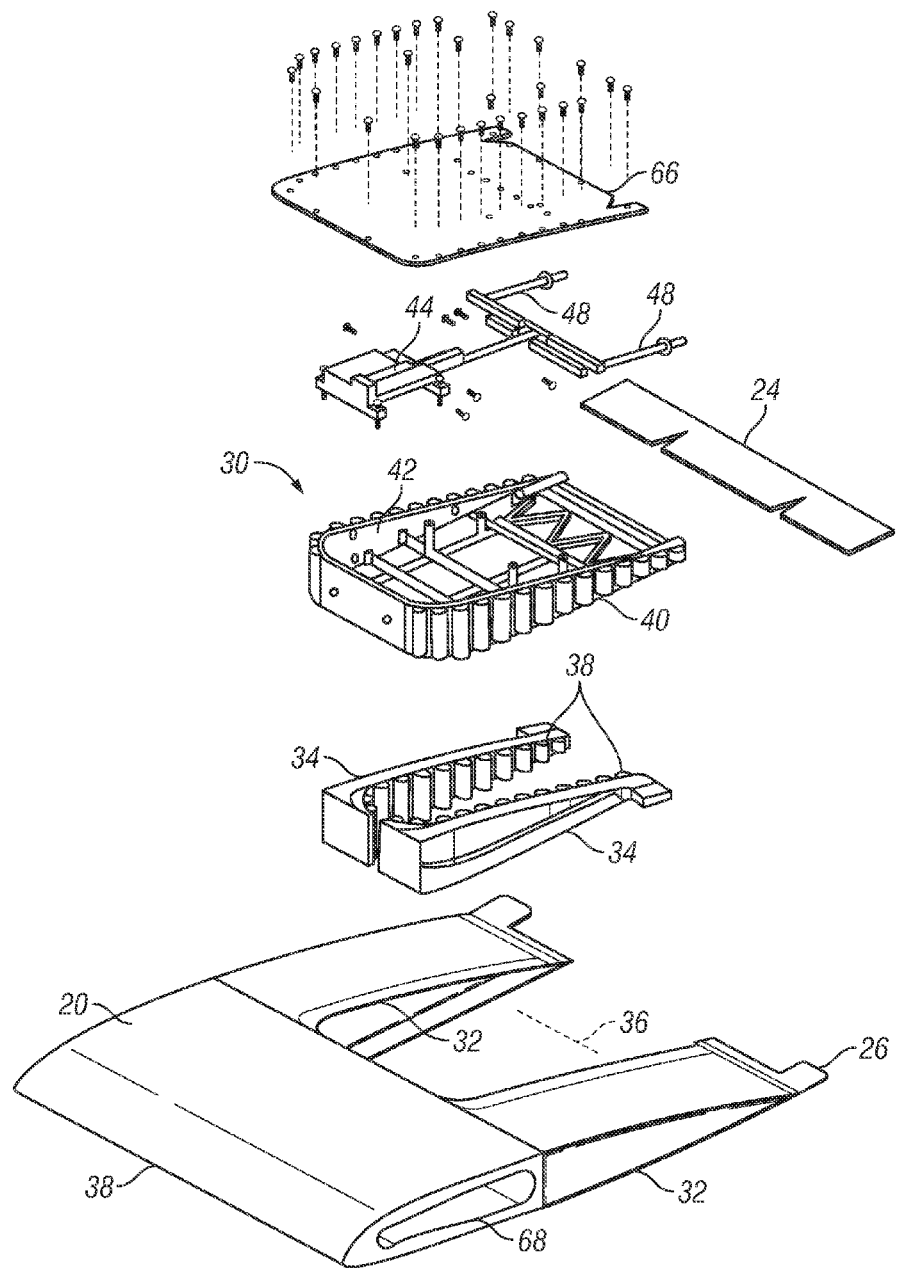
FIG. 2 is an exploded view of an embodiment of a control system of a rotor blade.

Referring now to FIG. 2, the trim tab 24 is installed at the rotor blade 20 via a modular installation unit 30. The unit 30 is installed within the pocket 32 of the rotor blade 20, without penetrating holes, or otherwise compromising the spar 68 therefore preserving structural integrity of the rotor blade 20. To facilitate installation of the unit 30, portions of the rotor blade 20 pocket 32 are removed, leaving an opening 36. One or more interface pieces 34 are installed in the rotor blade 20. As shown in FIG. 2, two interface pieces 34 may be utilized, one interface piece 34 at each lateral end of the rotor opening 36. The interface pieces 34 are secured to the rotor blade 20 via any preferable means, such as mechanical fasteners or adhesives.

Each interface piece 34 includes an interface dovetail 38 to receive a corresponding housing dovetail 40 of a housing 42. The housing 42 is installed in the rotor opening 36 between the two interface pieces 34, with the interface dovetail 38 meshing with the housing dovetail 40 to align and secure the housing 42 therein. In some embodiments a dampening material, for example, an elastomer or foam (not shown), may be inserted between the interface dovetail 38 and the housing dovetail 40.

The dovetail arrangement connecting the interface pieces 34 with the housing 42 and the location of the housing 42 within the pocket 32 reduces the reduction of structural integrity of the rotor blade 20 compared to the installations of the prior art. Further, the dovetail connection can be tuned by, for example, modifying a shape of the dovetails to further reduce undesirable effects such as noise and/or vibration.

Figure 3:
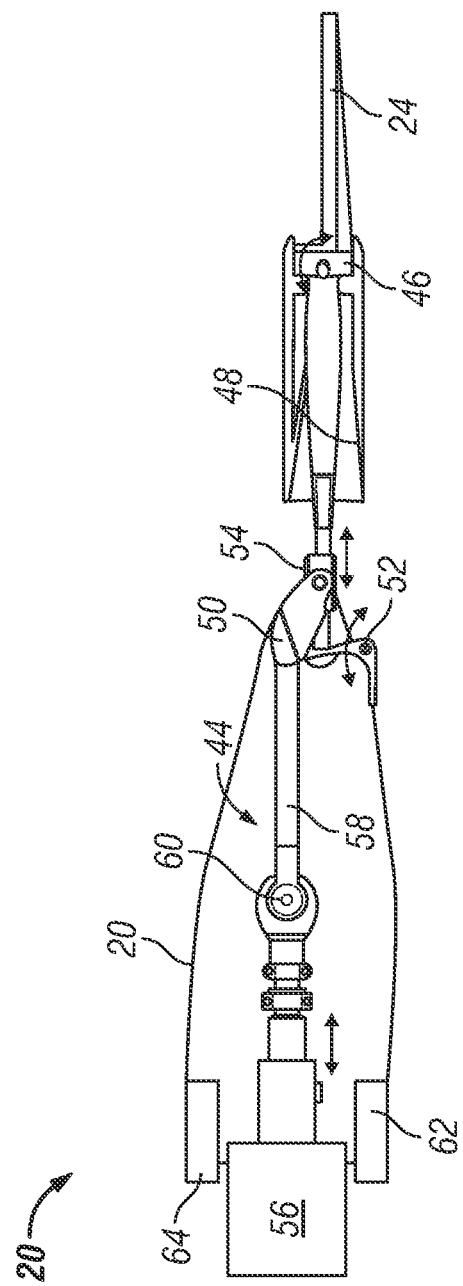
FIG. 3 is a cross-sectional view of an embodiment of a drive mechanism.

A drive mechanism 44 is installed in the housing 42, and may be secured therein by any conventional means. The drive mechanism 44 is connected to the trim tab 24 extending from the trailing edge 26 of the rotor blade 20. Referring to FIG. 3, the trim tab 24 is pivotably located at the trailing edge 26, specifically at a tab pivot 46. The drive mechanism 44 includes a hinge rod 48 connected to the trim tab 24, such that movement of the hinge rod 48 about the tab pivot 46 results in pivot of the trim tab 24 about the tab pivot 46. The drive mechanism 44 also includes a rocker 50 secured in the housing at a rocker pivot 52. The rocker 50 is connected to the hinge rod 48 via a slider 54. The slider 54 connection to the hinge rod 48 translates rotation of the rocker 50 about the rocker pivot 52 into rotation of the hinge rod 48 and thus the trim tab 24 about the tab pivot 46, via the sliding motion of the slider 54 along a length of the hinge rod 48. As is best shown in FIG. 2, more than one hinge rod 48 may connect the rocker 50 to the trim tab 24. For example, two hinge rods 48 are shown in FIG. 2. Each hinge rod 48 is connected to a unique slider 54 which is connected to the rocker 50.

The rocker 50 is in turn connected to an actuator 56 which may be, for example, a linear actuator, worm drive or the like. The actuator 56 acts to rotate the rocker 50 about the rocker pivot 52 to drive rotation of the trim tab 24 about the tab pivot 46. In some embodiments, an intermediate arm 58 is located between and connected to the actuator 56 and the rocker 50 via an actuator pivot 60, which allows relative rotation between the actuator 56 and the rocker 50. The drive mechanism 44 described herein is low-profile, thus fitting into existing space in the interior of the rotor blade 20, yet can deliver a relatively large amount of movement of the trim tab 24 about the tab pivot 46. In some embodiments, the rotation of the trim tab 24 about the tab pivot 46 is about +/− 5 degrees.

In some embodiments, a wireless controller 62 is located in the housing 42 to transmit commands from, for example, a flight control system (not shown), to the actuator 56. Further, in some embodiments, the actuator 56 may be powered by a power source located in the housing 42, for example, a battery pack 64. Finally, a cover plate 66 (shown in FIG. 2) is secured over the housing 42 to contain the drive mechanism 44 and preserve the aerodynamic shape of the rotor blade 20.

It is to be appreciated that while one drive mechanism 44 is illustrated and described herein, in some embodiments, more than one drive mechanism 44 may be contained in more than one housing 42 per rotor blade 20. Further, in some embodiments, more than one drive mechanism 44 may be contained in a housing 42.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor blade assembly comprising:
   a rotor blade;
   a first interface piece disposed at a pocket extending through an outer surface of the rotor blade, the first interface piece defining a first spanwise extent of the pocket;
   a second interface piece secured to the rotor blade to define a second spanwise end of the pocket; and
   a housing located at the rotor blade disposed entirely within the corresponding pocket, the housing secured to the first interface piece and the second interface piece via one or more interlocking elements of the housing.

2. The rotor blade assembly of claim 1, wherein the first interface piece is secured to the rotor blade via one or more of mechanical fasteners and/or adhesive.

3. The rotor blade assembly of claim 1, further comprising:
   a drive mechanism disposed in the housing; and
   a control surface operably connected to the drive mechanism, the drive mechanism controlling a position of the control surface.

4. The rotor blade assembly of claim 3, wherein the control surface is disposed at a trailing edge of the rotor blade.

5. The rotor blade assembly of claim 4, wherein the control surface is a trim tab.

6. The rotor blade assembly of claim 3, further comprising a wireless controller disposed in the housing and operably connected to the drive mechanism to communicate commands to the drive mechanism.

7. The rotor blade assembly of claim 3, further comprising a power source disposed in the housing and operably connected to the drive mechanism.

8. A control system for a rotor blade comprising:
   a first interface piece disposed at a pocket extending through an outer surface of a rotor blade, the first interface piece defining a first spanwise extent of the pocket;
   a second interface piece secured to the rotor blade to define a second spanwise end of the pocket;
   a housing located at the pocket, the housing secured to the first interface piece and the second interface piece via one or more interlocking elements of the housing;
   a drive mechanism secured in the housing including:
   an actuator;
   a rocker operably connected to the actuator, the rocker driven by linear motion of the actuator to rotate about a rocker pivot;
   a hinge rod operably connected to the rocker and operably connected to a control surface at a control surface pivot, the drive mechanism translating substantially linear motion of the actuator into rotational motion of the control surface about the control surface pivot; and
   a slider secured to the rocker and disposed at the hinge rod, and slidable along a length of the hinge rod to translate rotational motion of the rocker about the rocker pivot into rotational motion of the control surface about the control surface pivot via the sliding of the slider along the hinge rod.

9. The control system of claim 8, wherein the control surface is disposed at a trailing edge of the rotor blade.

10. The control system of claim 8, further comprising a wireless controller disposed in the housing and operably connected to the drive mechanism to communicate commands to the drive mechanism.

11. The control system of claim 8, further comprising a power source disposed in the housing and operably connected to the drive mechanism.

* * * * *